Figure 1:
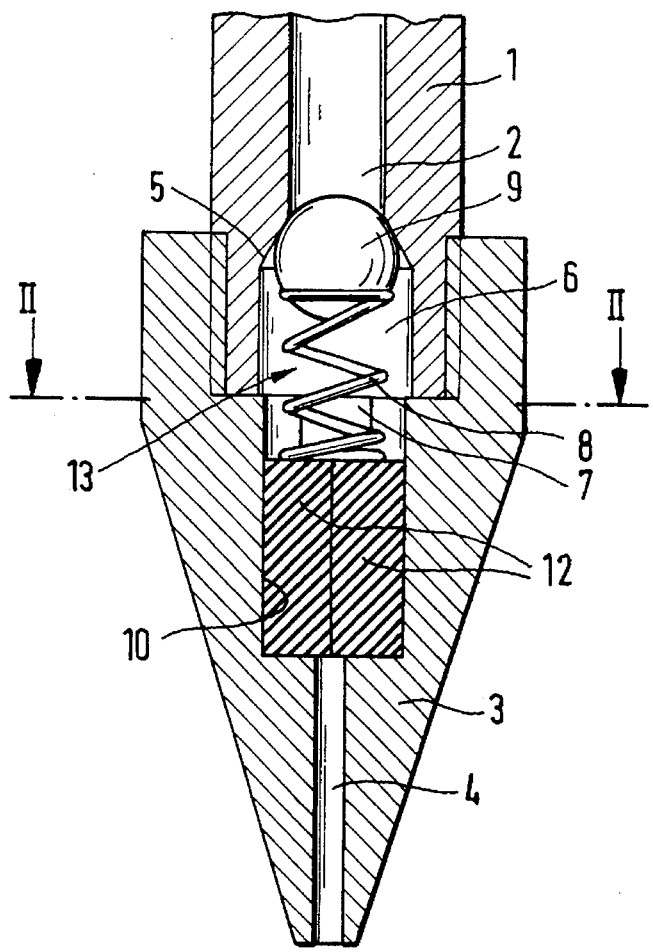

United States Patent [19]

Litzel

[11] Patent Number: 5,573,033
[45] Date of Patent: Nov. 12, 1996

[54] NON-DRIP VALVE

[75] Inventor: Rolf Litzel, Bad Wiessee, Germany

[73] Assignee: Loctite Europa EEIG, Germany

[21] Appl. No.: 492,646

[22] Filed: Jun. 20, 1995

[30] Foreign Application Priority Data

Jun. 20, 1994 [DE] Germany ............................ 9409973 U

[51] Int. Cl.⁶ ............................ F16K 15/14; F16K 21/04
[52] U.S. Cl. .................. 137/512.3; 137/539; 137/844; 251/212; 222/494
[58] Field of Search ................... 137/539, 512.3, 137/512, 843, 844; 251/212; 239/104, 119, 533.13, 570, 602; 222/494

[56] References Cited

U.S. PATENT DOCUMENTS

| 3,955,594 | 5/1976 | Snow | 137/844 |
| 5,052,594 | 10/1991 | Sørby. | |
| 5,113,911 | 5/1992 | Hirsh | 137/844 |

FOREIGN PATENT DOCUMENTS

| 2353929 | 5/1975 | Germany | 137/539 |
| 8130642.3 | 3/1982 | Germany. | |
| 3901032 | 2/1990 | Germany. | |
| 2095584 | 10/1982 | United Kingdom. | |
| 92/15811 | 9/1992 | WIPO. | |

Primary Examiner—Thomas E. Denion
Assistant Examiner—Christopher Verdier
Attorney, Agent, or Firm—Edward K. Welch II; Steven C. Bauman; Eugene F. Miller

[57] ABSTRACT

A non-drip valve for the discharge of liquid comprises a through-flow channel (2) from whose end the liquid emerges and at least one elastic member (12) within the through-flow channel (2) which reduces its volume when the pressure in the liquid increases and thereby frees the through-flow channel (2) and which enlarges its volume when the pressure of the liquid flow decreases and closes the through-flow channel when the pressure of the liquid flow falls below a certain pressure value.

13 Claims, 2 Drawing Sheets

NON-DRIP VALVE

The invention relates to a non-drip valve with a yielding element in a through-flow channel, which frees the through-flow channel only when a certain liquid pressure is reached.

Already known from DE-C-39 01 032 is a valve, in particular for an oil-atomizer nozzle of an oil burner, in which there is a spring-loaded closure member located in the inside of a valve chamber. The closure member frees the through-flow channel only when a certain target pressure is attained.

Known from DE-U-81 30 642 is a metering valve, in particular for the delivery of viscous liquids, in which dripping is prevented by the fact that a pipe-like tappet is arranged in displaceable manner in the through-flow channel and carries at its end an elastic moulded part as a sealing element which lies against the edge of a discharge opening when the valve is in the closed state. Because of the small volume of the space between the edge of the discharge opening and the sealing element, dripping of the valve after closure is avoided. To open the valve, the tappet is raised, e.g. using an electromagnet.

The object of the invention is to prevent liquid dripping from a valve.

According to the invention, this object is achieved by the fact that the yielding element is at least one elastic member, arranged within the through-flow channel, which reduces its volume when the pressure in the liquid increases and thereby frees the through-flow channel, and which enlarges its volume when the pressure in the liquid decreases and closes the through-flow channel when the pressure in the liquid falls below a certain pressure value.

Two elastic members are preferably arranged in the through-flow channel which are pressed apart by the liquid pressure. The two elastic members can be prestressed towards one another. The elastic members are generally cylinder or hose sections, made from an elastomer, arranged parallel to each other and to the direction of flow.

The elastic members bring about an integral behaviour when the volume flow increases and the liquid pressure correspondingly increases. When volume flow is reduced and the pressure is relieved, a differential behaviour of the valve results because of feedback and thereby a rapid, non-drip closure results.

In a particularly preferred embodiment of the invention, a non-return valve is arranged upstream from the elastic members, which frees the through-flow channel when a certain liquid pressure is exceeded. On closing the valve, the two elastic members expand at first. As a result, the volume between the elastic members and the non-return valve is reduced. This volume reduction results in a reduction in the differential pressure bearing against the non-return valve, which in turn means that the non-return valve closes more quickly. Conversely, the presence of the non-return valve also means that the elastic members enlarge more quickly and close the valve. During through-flow of the non-return valve, there is a certain pressure drop, with the result that the full pressure does not bear against the elastic member. This allows the two elastic members to close more quickly. A prerequisite for this reciprocal supporting of the non-return valve and of the two elastic members is that they close at approximately the same pressure value. The two elastic members preferably close before the non-return valve.

A particular advantage of the valve according to the invention is the fact that it is suitable for liquids whose viscosity values are very varied. The valve is suitable in particular for medium- and high-viscosity liquids, e.g. adhesives.

The elasticity constants of the helical pressure spring of the non-return valve and of the elastic members do not need to be the same and therefore also do not need to be linear.

The valve according to the invention is suitable in particular as a discharge valve of adhesive or sealing compound cartridges which are used in metering pistols. The cartridge is designed as a cylinder in which a piston is displaceable. Through a compressed air connection and a hand-operated valve, a pneumatic pressure is applied from the reverse side onto the piston, which thereby propels the adhesive or the sealing compound out of the discharge valve. Upon pressure relief of the hand-operated valve, the metering pistol is vented. The pneumatic pressure is thus reduced very quickly, whilst the pressure within the adhesive or the sealing compound is reduced relatively slowly. Despite the slow reduction in the pressure within the adhesive or the sealing compound, an immediate interruption of the discharge of the adhesive or the sealing compound is achieved by the valve according to the invention and, in particular, dripping is prevented. No other shut-off device within the fluid to be discharged is arranged upstream from the non-return valve. The valve according to the invention is therefore connected directly to the fluid source.

Another advantage of the valve according to the invention is the fact that it is independent of the supply of an auxiliary energy, it is constructed simply and is not susceptible to problems during operation. The production costs are extremely low.

Figure 2:
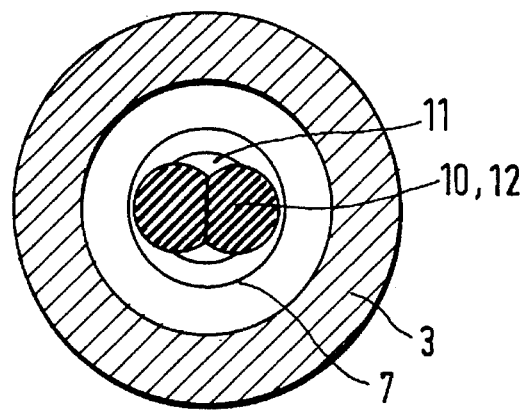
Figure 3:
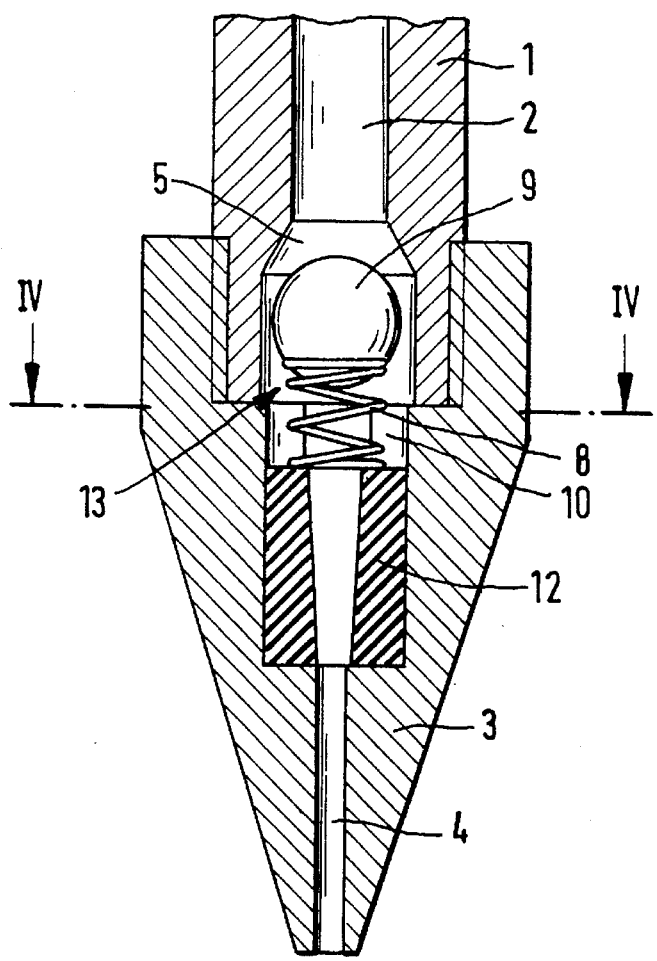
Figure 4:
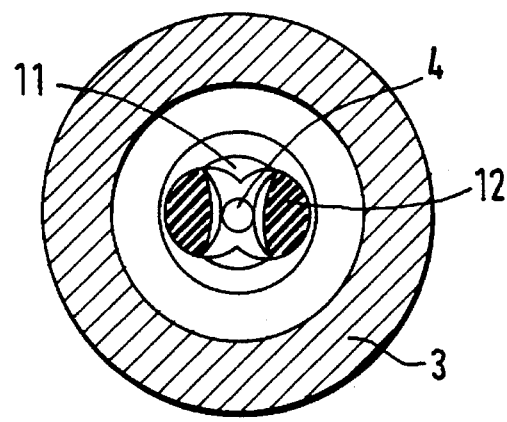

An embodiment of the invention is explained in more detail below with reference to the drawings. These show:

FIGS. 1 and 2 the valve in longitudinal section and in cross-section, in the closed state and FIGS. 3 and 4 the valve in longitudinal section and in cross section, in the opened state.

As shown in the drawings, the valve has a tubular member 1 with a through-flow channel 2. Screwed onto the end of the tubular member 1 is a tip 3 which has a discharge channel 4 which is in axial alignment with the through-flow channel 2, but is of essentially smaller cross-section.

The end of the through-flow channel 2 on the discharge side is extended in a conical stage 5 to a cylindrical chamber 6. The end of the discharge channel 4 on the inlet side in the tip 3 is cylindrically extended and forms a seat 7 for a helical pressure spring which presses a sphere 9 against the conical stage 5 at the end of the through-flow channel 2. The helical pressure spring 8, the sphere 9 and the conical stage 5 together thus form a non-return valve 13 which opens at a liquid pressure which depends on the characteristic values of the helical pressure spring 8 and the geometry of the sphere 9 and the conical stage 5.

There are also two cylindrical accommodation chambers 10 incorporated in the tip 3 which have a clearly greater depth than the seat 7. Viewed in cross-section, the cylindrical chambers 10 overlap somewhat and lie symmetrical to the axis of the discharge channel 4. The diameter and the extent of overlapping of the chambers 10 are selected such that a sufficient area 11 still remains at the base of the seat 7 for supporting the helical pressure spring 8. The areas 11 can be seen in FIGS. 2 and 4. These are triangular areas with two concave and one longer, convex side. Underneath the seat 7, the chambers 10 are filled by cylindrical elastomer members 12. The elastomer members preferably touch each other at the interface, at which the two chambers 10 fuse together and press against each other at this contact surface, so that they are prestressed. In so doing, the helical pressure spring 8 holds the elastomer members 12 in the chambers 10.

The two elastomer members 12 lying alongside one another in prestressed manner close the discharge channel 4, although the liquid in the space between the sphere 9 and the helical pressure spring 8 is not pressure relieved to nought, this space is reduced by the elastomer members 12 and the force of the helical pressure spring 8 thereby exceeds the force from the smaller pressure difference via the sphere 9. The non-return valve 13 closes more quickly. The elastomer members 12 alter the volume for the liquid according to pressure in such a way that the valve closes with differential behaviour in control engineering terms, because of the integral proportion of the controlled system.

Through the retroaction of the elastomer members 12, the operation of the non-return valve 13 is improved in such a way that a fault-free flowing process of the liquid after the start of flow is achieved and the supporting closure operation is improved.

I claim:

1. A non-drip valve for discharging a fluid comprising:
   (a) a valve body including a flow-through channel having a first and second end and defining a flow-path therethrough;
   (b) a first valve located within said channel and proximate to said first end, said first valve being operable under fluid pressure to sealingly seat within said channel to selectively open and close said flow-path;
   (c) a second valve including at least one elastomer member located within said channel and located downstream of said first valve, said second valve being expandable and contractable under fluid pressure to selectively open and close said flow-path;
   wherein said first and second valves cooperatively open and close in response to said fluid pressure such that the seating of said first valve is effected by the volumetric expansion of said second valve in response to the reduction in fluid pressure.

2. A non-drip valve as in claim 1 wherein said second valve comprises two elastomeric members.

3. A non-drip valve as in claim 2 wherein said elastomeric members are cylinder sections arranged parallel to each other in the direction of fluid flow.

4. A non-drip valve as in claim 2 wherein said two elastomeric valves are sealably prestressed against one another.

5. A non-drip valve as in claim 1 wherein said first valve includes a compression spring and a spherical stopper element.

6. A non-drip valve as in claim 5 wherein said first valve includes an annular seat member for said spherical stopper element.

7. A non-drip valve as in claim 5 wherein said compression spring seats on said elastomer member.

8. A non-drip valve as in claim 7 wherein said first valve is further effected by the force of the compression spring to seat said spherical stopper element.

9. A non-drip valve for discharging a fluid comprising:
   (a) a valve body including a flow-through channel having a first and second end and defining a flow-path therethrough;
   (b) a first valve including a compression spring, a spherical stopper element and a seat for said stopper element, wherein said spherical stopper element is braced against said seat when said valve is closed;
   (c) a second valve located downstream including at least one elastomeric member which is contractable and expandable to open and close respectively in response to fluid pressure;
   wherein said first and second valves cooperatively open and close under substantially the same fluid pressure.

10. A non-drip valve as in claim 9 wherein said compression spring is seated on said elastomeric member of said second valve.

11. A non-drip valve as in claim 10 wherein a reduction in fluid pressure causes said second valve to expand and increases the force exerted on said spherical stopper element of said first valve thereby increasing the speed of seating of said stopper element against said seat.

12. A non-drip valve as in claim 9 wherein said second valve includes two elastomeric members.

13. A non-drip valve as in claim 12 wherein said elastomeric members are cylinder sections which are prestressed against one another.

* * * * *